(12) United States Patent
Mitsuhashi et al.

(10) Patent No.: US 9,559,350 B2
(45) Date of Patent: Jan. 31, 2017

(54) METHOD FOR PRODUCING NONAQUEOUS ELECTROLYTE SECONDARY BATTERY

(75) Inventors: Toshihiko Mitsuhashi, Toyota (JP); Yoshiyuki Ozaki, Neyagawa (JP); Hideki Sano, Okazaki (JP); Hajime Konishi, Ikoma (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/360,342

(22) PCT Filed: Nov. 24, 2011

(86) PCT No.: PCT/JP2011/077074
§ 371 (c)(1),
(2), (4) Date: May 23, 2014

(87) PCT Pub. No.: WO2013/076847
PCT Pub. Date: May 30, 2013

(65) Prior Publication Data
US 2014/0322579 A1  Oct. 30, 2014

(51) Int. Cl.
*H01M 4/13* (2010.01)
*H01M 4/04* (2006.01)
(Continued)

(52) U.S. Cl.
CPC ........... *H01M 4/0402* (2013.01); *H01M 2/362* (2013.01); *H01M 4/0452* (2013.01);
(Continued)

(58) Field of Classification Search
CPC ........... H01M 10/0567; H01M 10/058; H01M 10/0585; H01M 10/0587; H01M 2/362; H01M 4/0402
See application file for complete search history.

(56) References Cited

U.S. PATENT DOCUMENTS

2002/0160253 A1* 10/2002 Vaidyanathan ..... H01M 10/049
429/52
2009/0106970 A1  4/2009 Fan et al.
(Continued)

FOREIGN PATENT DOCUMENTS

CN  101420048 A  4/2009
CN  102082292 A  6/2011
(Continued)

*Primary Examiner* — Patrick Ryan
*Assistant Examiner* — Ben Lewis
(74) *Attorney, Agent, or Firm* — Finnegan, Henderson, Farabow, Garrett & Dunner, LLP

(57) ABSTRACT

The present invention provides a method for producing a nonaqueous electrolyte secondary battery in which the drop in capacity retention rate is controlled by forming a coating in a more favorable state on the surface of the negative electrode active material. This production method comprises a step S10 of preparing a battery assembly in which an electrode assembly is housed within a battery case, the electrode assembly including a positive electrode produced by forming a positive electrode active material layer containing at least a positive electrode active material, and a negative electrode produced by forming a negative electrode active material layer containing at least a negative electrode active material; a first injection step S20 of injecting a nonaqueous electrolyte containing a specified additive into the battery case; a precharging step S30 of forming the additive-derived coating on the surface of the negative electrode active material; a second injection step S40 of injecting a nonaqueous electrolyte not containing an additive into the battery case; and a charge and discharge step S50 of charging and discharging the battery assembly to a predetermined charging and discharge voltage.

8 Claims, 8 Drawing Sheets

(51) Int. Cl.
 *H01M 2/36* (2006.01)
 *H01M 4/139* (2010.01)
 *H01M 4/36* (2006.01)
 *H01M 4/62* (2006.01)
 *H01M 10/0567* (2010.01)
 *H01M 10/058* (2010.01)
 *H01M 10/0585* (2010.01)
 *H01M 10/0587* (2010.01)
 *H01M 4/131* (2010.01)
 *H01M 4/1391* (2010.01)

(52) U.S. Cl.
 CPC ............ *H01M 4/13* (2013.01); *H01M 4/139* (2013.01); *H01M 4/366* (2013.01); *H01M 4/628* (2013.01); *H01M 10/058* (2013.01); *H01M 10/0567* (2013.01); *H01M 10/0585* (2013.01); *H01M 10/0587* (2013.01); *H01M 4/131* (2013.01); *H01M 4/1391* (2013.01); *Y02E 60/122* (2013.01); *Y10T 29/49115* (2015.01)

(56) References Cited

U.S. PATENT DOCUMENTS

| | | | |
|---|---|---|---|
| 2009/0130555 A1 | 5/2009 | Ichihashi | |
| 2010/0129721 A1* | 5/2010 | Xu | H01M 4/5825 429/300 |
| 2010/0313410 A1* | 12/2010 | Min | H01M 10/0567 29/623.2 |
| 2012/0021264 A1* | 1/2012 | Morishima | H01M 10/0587 429/94 |

FOREIGN PATENT DOCUMENTS

| | | | | |
|---|---|---|---|---|
| JP | 2006-294282 | * 10/2006 | ............ | H01M 10/40 |
| JP | 2009-123605 | 6/2009 | | |
| JP | 2009-176534 | 8/2009 | | |
| JP | 2010-129192 | 6/2010 | | |
| JP | 2010-282836 | 12/2010 | | |

* cited by examiner

METHOD FOR PRODUCING NONAQUEOUS ELECTROLYTE SECONDARY BATTERY

CROSS-REFERENCE TO RELATED APPLICATIONS

This application is a national phase application of International Application No. PCT/JP2011/077074, filed Nov. 24, 2011, the content of which is incorporated herein by reference.

TECHNICAL FIELD

The present invention relates to a method for producing a nonaqueous electrolyte secondary battery.

BACKGROUND ART

Nonaqueous electrolyte secondary batteries such as lithium ion secondary batteries are becoming more important as power sources to be mounted in vehicles that utilize electricity as a motor driving power supply, as power sources to be used in personal computers, portable terminals, and other electronic products, and so on. In particular, lithium ion secondary batteries that are lightweight and provide a high energy density are preferred as high output power sources to be mounted in vehicles.

In nonaqueous secondary batteries such as lithium ion secondary batteries, however, a part of the nonaqueous electrolyte can decompose during charging, and a solid electrolyte interphase (SEI) film, which is a coating formed from the decomposition products thereof, can be formed on the surface of the negative electrode active material (for example, natural graphite particles). The SEI coating plays a role in protecting the negative electrode active material, but because it is formed by expending the charge carrier (for example, lithium ions) in the nonaqueous electrolyte, (in other words, through being immobilized in the SEI layer the charge carrier can no longer contribute to capacity), if the amount of the coating is too great, it becomes a factor that contributes to a drop in capacity retention rate (decrease in cycling characteristics).

To counteract this problem, an additive that decomposes at or above a predetermined charging voltage and forms a coating on the surface of the negative electrode active material can be included in the nonaqueous electrolyte so that it will form a stable coating beforehand on the surface of the negative electrode active material in place of the SEI coating.

The use of such an additive is noted in Patent Literature 1 as prior art. Patent Literature 1 describes a technique wherein an attempt is made to form a coating on the surface of the negative electrode active material by injecting a nonaqueous electrolyte containing a specified additive, performing an initial charging, and thereafter further re-injecting the above nonaqueous electrolyte containing the specified additive, and recharging the battery.

CITATION LIST

Patent Literature

Patent Literature 1: Japanese Patent Application Laid-open No. 2010-129192

SUMMARY OF INVENTION

Technical Problem

However, although a coating can be formed on the surface of the negative electrode active material in the technique disclosed in abovementioned Patent Literature 1, whereas a large amount of coating is formed on the negative electrode active material present at both end portions in the crosswise direction orthogonal to the lengthwise direction of the negative electrode (typically the negative current collector), only a small amount of coating is formed on the negative electrode active material present in the central portion in the crosswise direction. This is undesirable because if the non-uniformity in the amount of coating (coating concentration non-uniformity; hereinafter simply referred to as "coating non-uniformity") of the negative electrode active material in the crosswise direction on the negative electrode becomes too great, capacity retention rate will decrease.

Therefore, the present invention was created to solve the prior art problem described above, and an object of the present invention is to provide a method for producing a nonaqueous electrolyte secondary battery in which the drop in capacity retention rate is controlled by forming a coating on the surface of the negative electrode active material in a more favorable state.

Solution to Problem

To realize this object, the present invention provides a method for producing a nonaqueous electrolyte secondary battery. More specifically, the method for producing a nonaqueous electrolyte secondary battery disclosed herein comprises:

a step of preparing a battery assembly in which an electrode assembly is housed within a battery case, the electrode assembly including a positive electrode produced by forming a positive electrode active material layer containing at least a positive electrode active material on a positive current collector and a negative electrode produced by forming a negative electrode active material layer containing at least a negative electrode active material on a negative current collector;

a first injection step of injecting, into the battery case, a nonaqueous electrolyte containing an additive that decomposes and forms a coating on the surface of the negative electrode active material at a predetermined charging voltage;

a precharging step of forming the additive-derived coating on the surface of the negative electrode active material by charging the battery assembly up to at least the predetermined charging voltage;

a second injection step of injecting, into the battery case, a nonaqueous electrolyte not containing an additive that decomposes and forms a coating on the surface of the negative electrode active material at the predetermined charging voltage; and a charge and discharge step of, after the battery assembly has been charged to the predetermined charge voltage, discharging the battery assembly to a predetermined discharge voltage.

In this description, the term "nonaqueous electrolyte secondary battery" refers to a battery that features a nonaqueous electrolyte (typically an electrolyte containing a supporting electrolyte (supporting salt) in a nonaqueous medium). Moreover, the term "secondary battery" generally refers to a battery capable of repeated charging and discharging, and this term includes so-called chemical batteries such as lithium-ion secondary batteries and physical batteries such as electric bilayer capacitors.

In the method for producing the nonaqueous electrolyte secondary battery provided by the present invention, after a nonaqueous electrolyte containing the additive is injected into the battery case, the battery assembly is charged up to a charging voltage whereat the additive decomposes, and after charging a nonaqueous electrolyte not containing the additive is injected into the battery case, and the battery assembly is charged and discharged to a predetermined discharge voltage.

Thus, by first injecting the nonaqueous electrolyte containing the additive into the battery case, and then charging the battery assembly to a predetermined charging voltage whereat the additive will decompose, an additive-derived coating is formed on the surface of the negative electrode active material present in the negative electrode active material layer, and conditions can be obtained wherein the non-uniformity of the coating is decreased in the negative electrode active material layer in the crosswise direction orthogonal to the lengthwise direction (preferably, a state wherein the coating is uniform in the crosswise direction). In a lithium-ion secondary battery including a negative electrode in which the non-uniformity of this coating is decreased, the drop in capacity retention rate can be prevented. In addition, the capacity retention rate of a lithium-ion secondary battery can be increased by injecting the nonaqueous electrolyte not containing the additive into the battery case, and also no additional coating of additive will be formed on the surface of the negative electrode active material in the charge and discharge step that follows injection of the nonaqueous electrolyte. Therefore, a lithium-ion secondary battery can be produced wherein the state of decreased non-uniformity of the coating in the crosswise direction is maintained, and capacity retention rate is also increased.

In one preferred mode of the production method disclosed herein, when the total amount of nonaqueous electrolyte injected into the battery case in the first injection step and the second injection step is assigned a value of 100 mass %, the amount of nonaqueous electrolyte injected in the first injection step is determined to be set at 60 mass % to 80 mass %, and also to be greater than or equal to the amount of nonaqueous electrolyte that can be retained in the electrode assembly.

With such a configuration the nonaqueous electrolyte is injected into the battery case in an amount that can spread throughout and be retained by the entirety of the electrode assembly, and the amount of nonaqueous electrolyte (surplus electrolyte) that can be a cause of coating non-uniformity is very little or substantially none at all. Therefore, in the precharging step the additive-derived coating can be formed on the surface of the negative electrode active material in a more favorable state.

Another preferred mode of the production method disclosed herein further comprises a step of, after the first injection step, letting the battery assembly stand for a long enough time for the injected nonaqueous electrolyte containing the additive to be retained throughout the entirety of the electrode assembly.

With such a configuration the injected nonaqueous electrolyte containing the additive can be retained by (impregnated into) the entirety of the electrode assembly uniformly. Therefore, in the precharging step the additive-derived coating can be formed on the surface of the negative electrode active material in a more favorable state (for example, a uniform state).

In another preferred mode of the production method disclosed herein, charging is carried out in the precharging step so that the SOC (state of charge) reaches 50% to 100%. The additive can be decomposed satisfactorily by charging until the SOC lies within this range, and an additive-derived coating can be formed on the surface of the negative electrode active material.

In another preferred mode of the production method disclosed herein, one or more compounds selected from the group consisting of lithium bis(oxalate)borate, vinylene carbonate, vinyl ethylene carbonate, fluoroethylene carbonate and lithium difluorophosphate is used as the additive. Such additives decompose well in the precharging step and can form an additive-derived coating with preferred properties on the surface of the negative electrode active material.

Preferably, at least lithium bis(oxalate)borate (LiBOB) is used as the additive. A coating formed by using such an additive performs even better preventing the drop in capacity retention rate.

In another preferred mode of the production method disclosed herein, a negative electrode including a negative current collector and a negative electrode active material layer containing at least a negative electrode active material and formed on the surface of the negative current collector is used as the negative electrode, the length of the negative electrode active material layer in a crosswise direction orthogonal to a lengthwise direction of the negative current collector being at least 80 mm.

In an negative electrode in which the length of the negative electrode active material layer in the crosswise direction is 80 mm or longer, non-uniformity in the coating occurs easily in the crosswise direction when the additive-derived coating is formed. Therefore, the advantageous effect can be particularly well exhibited by using the configuration of the present invention wherein the nonaqueous electrolyte containing the additive is injected, the battery is charged to the predetermined charging voltage, nonaqueous electrolyte not containing the additive is injected, and the battery is cycled to the predetermined discharge voltage.

Moreover, the present invention provides a nonaqueous electrolyte secondary battery as another aspect. In other words, the nonaqueous electrolyte secondary battery disclosed herein includes a stacked or wound electrode assembly including a positive electrode and a negative electrode, and a nonaqueous electrolyte. The negative electrode includes a negative current collector and a negative electrode active material layer containing at least a negative electrode active material and formed on the surface of the negative current collector. A boron-containing coating that contains at least boron (B) is formed on the surface of the negative electrode active material in the negative electrode active material layer. Here the value A/B is 1 to 1.3, the value representing the ratio of boron content A [mass %] in the negative electrode active material layer, when the solid content of the negative electrode active material layer at either end portion in a crosswise direction orthogonal to a lengthwise direction of the negative current collector is assigned a value of 100 mass %, to boron content B [mass %] in the negative electrode active material layer, when the solid content of the negative electrode active material layer at the central portion containing a midpoint in the crosswise direction is assigned a value of 100 mass %.

In the present description the term "an end portion of the negative electrode active material layer in the crosswise direction orthogonal to the lengthwise direction of the negative current collector" is a region that includes either edge of the negative electrode active material layer in the crosswise direction, and does not include the central portion in the crosswise direction, and when the negative electrode active material layer is partitioned in the crosswise direction, refers to a region comprising ⅓ or less (for example, ⅕ or less) of the negative electrode active material layer. On the other hand, the term "an central portion containing the midpoint in the crosswise direction" is a region that includes the midpoint in the crosswise direction and excludes the end portions, and when the negative electrode active material layer is partitioned in the crosswise direction, refers to a region comprising or less ⅓ (for example, ⅕ or less) of the negative electrode active material layer. Moreover, both end portions and the central portion can be adjacent to each other, but typically regions contained in neither will lie between the end portions and the central portion.

In the nonaqueous electrolyte secondary battery provided by the present invention, a boron-containing coating is formed on the surface of the negative electrode active material that is present in the negative electrode active material layer, and the value of A/B, which is the ratio of boron content A [mass %] to boron content B [mass %], is 1 to 1.3. With this configuration it is possible to obtain a nonaqueous electrolyte secondary battery with high capacity retention rate because the boron-containing coating formed on the surface of the negative electrode active material in the negative electrode active material layer is a coating with very little non-uniformity in the crosswise direction of the negative electrode active material layer.

Preferably, the length of the negative electrode active material layer in the crosswise direction is at least 80 mm.

Thus, the nonaqueous electrolyte secondary battery (for example, a lithium-ion secondary battery) disclosed herein or a nonaqueous electrolyte secondary battery obtained by any manufacturing method can become a nonaqueous electrolyte secondary battery with high capacity retention rate that can be maintained because the coating is formed in a preferred state (a state with little or no coating non-uniformity) on the surface of the negative electrode active material. Therefore, the battery can be used as a motor driving power supply in vehicles (typically automobiles, and particularly automobiles featuring an electric motor such as hybrid automobiles, electric automobiles, and fuel cell automobiles). Moreover, as another aspect, the present invention provides a vehicle featuring any of the nonaqueous electrolyte secondary batteries disclosed herein (which can assume the form of a battery pack wherein a plurality of batteries are typically connected in series) as a motor driving power supply.

DESCRIPTION OF EMBODIMENTS

Preferred embodiments of the present invention are described below. All matters necessary for carrying out that present invention that are not specifically presented in this description can be understood by persons skilled in the art to be design matters based on prior art in this field. The present invention can be carried out on the basis of the content disclosed herein and common technical knowledge in this field.

As one preferred embodiment of the method for producing the nonaqueous electrolyte secondary battery disclosed herein, a method for producing a lithium-ion secondary battery will be presented in detail as an example, but the target of practical application of the present invention is by no means limited to this type of secondary battery. For example, the present invention can be practically applied to a nonaqueous electrolyte secondary battery that uses a different metal ion (for example, a magnesium ion) as the charge carrier.

Figure 3:
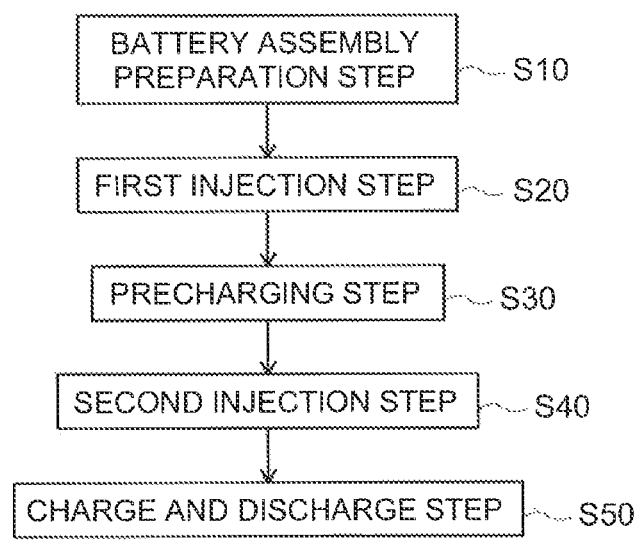
FIG. 3 is a flow chart to explain the production method of the nonaqueous electrolyte secondary battery in one embodiment of the present invention.

As shown in FIG. 3, the method for producing the nonaqueous electrolyte secondary battery (lithium-ion secondary battery) disclosed herein includes a battery assembly preparation step (S10), a first injection step (S20), a precharging step (S30), a second injection step (S40), and a charge and discharge step (S50).

<<Battery Assembly Preparation Step (S10)>>

First the battery assembly preparation step (S10) will be explained. The battery assembly preparation step includes preparing a battery assembly in which an electrode assembly is housed within a battery case, the electrode assembly including a positive electrode produced by forming a positive electrode active material layer containing at least a positive electrode active material on a positive current collector, and a negative electrode produced by forming a negative electrode active material layer containing at least a negative electrode active material on a negative current collector.

The electrode assembly (for example, a stacked or wound electrode assembly) of the lithium-ion secondary battery disclosed herein includes a positive electrode, a negative electrode, and separators disposed between the positive and negative electrodes. In this case, a wound electrode assembly will be presented as an example, but the present invention is by no means limited thereto.

The positive electrode of the lithium-ion secondary battery disclosed herein includes a positive current collector and a positive electrode active material layer containing at least a positive electrode active material formed on the positive current collector.

Aluminum or an aluminum alloy having aluminum as the main component thereof can be used for the positive current collector just as in the case of a positive current collector used in the positive electrode of a previous lithium-ion secondary battery. The shape of the positive current collector is not particularly limited herein because it can differ in accordance with the shape, etc., of the lithium-ion secondary battery, and it can assume a variety of forms such as a foil, sheet, rod, plate, and the like.

An example of the positive electrode active material is a lithium-containing compound (for example, a lithium-transition metal compound oxide) containing elemental lithium, and one or two or more elemental transition metals, and it is a material that can store and release lithium ions. Examples include lithium-nickel compound oxides (for example, $LiNiO_2$), lithium-cobalt compound oxides (for example, $LiCoO_2$), lithium-manganese compound oxides (for example, $LiMn_2O_4$), or ternary lithium-containing compound oxides such as lithium-nickel-cobalt-manganese oxide (e.g. $LiNi_{1/3}Co_{1/3}Mn_{1/3}O_2$).

Moreover, polyanionic compounds such as one represented by the general formula $LiMPO_4$ or $LiMVO_4$ or $Li_2MSiO_4$ (wherein M is at least one or more elements selected from among Co, Ni, Mn, and Fe), etc., (for example, $LiFePO_4$, $LiMnPO_4$, $LiFeVO_4$, $LiMnVO_4$, $Li_2FeSiO_4$, $Li_2MnSiO_4$, and $Li_2CoSiO_4$) can be used as the positive electrode active material.

Furthermore, any conductive material previously used in this type of lithium-ion secondary battery can be used and is not particularly limited herein. For example, carbon materials such as carbon powder or carbon fibers can be used. Carbon powders such as various types of carbon black (for example, acetylene black, furnace black, Ketjen black) or graphite powder can be used as the carbon powder. One or two or more types thereof can be combined and used together.

The same kind of binder that is used in the positive electrode of a typical lithium ion secondary battery can be suitably used as the binder. For example, when a solvent-based paste-like composition (paste-like compositions include slurry-like compositions and ink-like compositions) is used as the composition for forming the positive electrode active material layer, a polymer material that dissolves in an organic solvent (nonaqueous medium) such as polyvinylidene fluoride (PVDF), polyvinylidene chloride (PVDC) and the like can be used. Alternatively, when a water-based paste-like composition is used, a polymer that dissolves or disperses in water can be preferably used. Examples thereof include polytetrafluoroethylene (PTFE), carboxymethyl cellulose (CMC) and the like. It should also be noted that the polymer material listed above can be used as a thickener or other additive for the above composition in addition to being used as a binder.

Here the term "solvent-based paste-like composition" is a concept referring to a composition wherein the dispersing medium of the positive electrode active material is mainly an organic solvent. For example, N-methyl-2-pyrrolidone (NMP), etc., can be used as the organic solvent. Herein the term "water-based paste-like composition" is a concept referring to a composition wherein water or a mixed solvent consisting primarily of water is used as the dispersing medium for the positive electrode active material. One or two or more types of an organic solvent that can mix homogenously with water (a lower alcohol, lower ketone, etc.) can be suitably selected and used as a medium other than water constituting the mixed medium.

In general, the positive electrode disclosed herein can be suitably produced, for example, by the following process. A composition for forming a paste-like positive electrode active material layer is prepared by dispersing the positive electrode active material, conductive material, and a binder that is soluble in an organic solvent, etc., in an organic solvent. A positive electrode including a positive current collector and a positive electrode active material layer formed thereon can then be fabricated by applying the prepared composition to a current collector and compressing (pressing) it after drying.

The negative electrode of the lithium-ion secondary battery disclosed herein includes a negative current collector and a negative electrode active material layer containing at least a negative electrode active material formed on the negative current collector.

A conductive material made of a metal with excellent conductivity can be preferably used for the negative current collector just as in the case of a current collector used in the negative electrode of a previous lithium-ion secondary battery. For example, copper, nickel, or alloys having these metals as the main component thereof can be used. The shape of the negative current collector can be the same as the shape of the positive current collector.

Examples of the negative electrode active material include particulate carbon materials containing at least in part a graphite structure (layered structure), lithium-transition metal compound oxides (for example, a lithium-titanium compound oxide such as $Li_4Ti_5O_2$), lithium-transition metal compound nitrides, etc. Examples of carbon materials include natural graphite (for example, scaly graphite), artificial graphite, hard carbon, soft carbon and the like. Moreover, the surface of the negative electrode active material can be coated with an amorphous carbon film. For example, a negative electrode active material that is at least partially coated by an amorphous carbon film can be obtained by mixing pitch with the negative electrode active material and baking the mixture. Preferably, the carbon material is natural graphite, etc.

As needed, the negative electrode active material layer can contain desired components such as binder, thickener, etc., other than the negative electrode active material.

The same kind of binder, etc., that is used in the negative electrode of a typical lithium-ion secondary battery can be suitably used as the binder. For example, when a water-based paste-like composition is used to form the negative electrode active material layer, a polymer that dissolves or disperses in water can be preferably used. Examples of polymers that disperse in water (water-dispersible polymers) include types of rubber such as styrene-butadiene rubber (SBR), and fluorocarbon rubbers; fluorocarbon resins such as polyethylene oxide (PEO) and polytetrafluoroethylene (PTFE); and vinyl acetate copolymers, and the like.

Moreover, a polymer material that dissolves or disperses in water or a solvent (organic solvent) can be used as the binder. Examples of polymer materials that dissolve in water (water-soluble polymers) include cellulose polymers such as carboxymethyl cellulose (CMC), methyl cellulose (MC), cellulose acetate phthalate (CAP), and hydroxypropyl methylcellulose (HPMC); polyvinyl alcohols (PVA); and the like.

In general, the negative electrode disclosed herein can be suitably produced, for example, by the following process. First a composition for forming the paste-like negative electrode active material layer is prepared by dispersing the negative electrode active material and other desired components (binder, thickener, etc.) in a solvent (water, for example). A negative electrode including a negative current collector and a negative electrode active material layer formed thereon can then be fabricated by applying the prepared composition to a current collector and compressing (pressing) it after drying.

The length of the negative electrode active material layer in the crosswise direction orthogonal to the lengthwise direction of the negative current collector is not particularly limited herein, but the advantageous effect of the present invention can be particularly well exhibited in one having a length of at least about 80 mm. For example, the layer is about 80 mm to 150 mm, and preferably about 100 mm to 120 mm.

A previous publicly known separator can be used as the separator herein without any particular limitations. For example, a porous sheet made of a resin (microporous resin sheet) can be preferably used. A resin sheet of a porous polyolefin such as polyethylene (PE), polypropylene (PP), and the like is preferred. For example, a PE sheet, PP sheet, or a sheet with a three-layer structure wherein a PP layer is disposed on both sided of a PE layer (PP/PE/PP structure) and the like can be suitably used.

Figure 2:
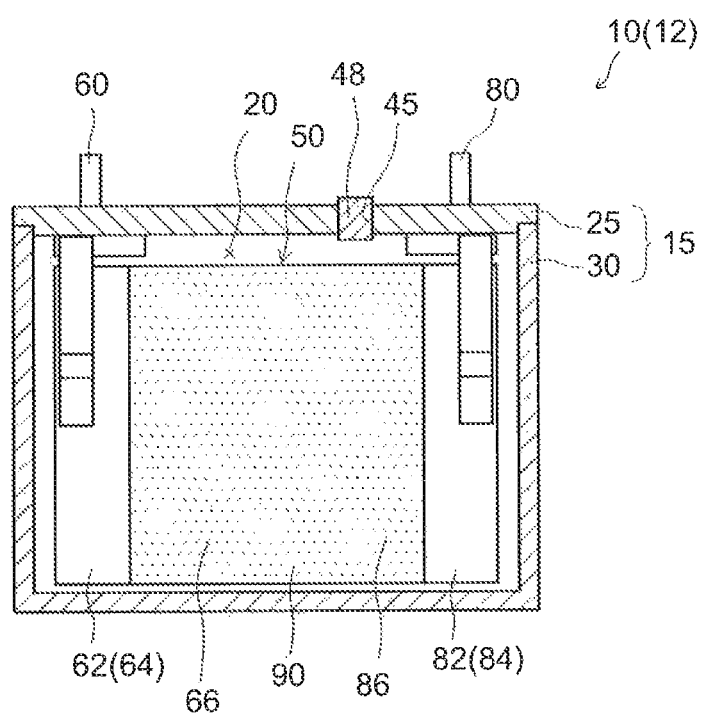
FIG. 2 is a cross-sectional view along line II-II in FIG. 1.

As shown in FIG. 2, the wound electrode assembly 50 of the present embodiment is one wherein a sheet-shaped positive electrode 64 and sheet-shaped negative electrode 84 overlain and interposed with total of two continuous-sheet separators 90 are wound together, and then the resulting wound assembly is compressed from the side and flattened to produce the flattened wound electrode assembly 50.

As shown in FIG. 2, during the layering process the positive electrode 64 and negative electrode 84 are overlain at a slight offset in the crosswise direction so that the part of the positive electrode 64 whereon the positive active material layer is not formed (i.e., the part wherein the positive current collector 62 is exposed without a positive electrode active material layer 66 being formed thereon) and the part of the negative electrode 84 whereon the negative electrode active material is not formed (i.e., the part wherein the negative current collector 82 is exposed without a negative electrode active material layer 86 being formed thereon) will protrude from both sides of the separators 90 in the crosswise direction. As a result, the positive electrode 64 and the negative electrode 84, respectively, wherein the electrode active material layers were not formed, protrude from the core (i.e., the part wherein the positive electrode 64 whereon the positive active material layer was formed, the negative electrode 84 whereon the negative active material layer was formed, and the two separators 90 are tightly wound together) outward in the lateral direction with respect to the wound direction of the wound electrode assembly 50. The positive terminal 60 is joined to the protruding part on the positive side to electrically connect the positive terminal 60 to the positive electrode 64 of the wound electrode assembly 50 that has been formed into a flattened shape. Likewise, the negative terminal 80 is joined to the protruding part on the negative electrode side to electrically connect the negative terminal 80 to the negative electrode 84. The positive and negative terminals 60, 80 are connected to their respective positive and negative collectors 62, 82, for example, by ultrasonic welding, resistance welding, and the like.

Furthermore, as shown in FIG. 2, a battery assembly 12 is fabricated (prepared) by placing the fabricated wound electrode assembly 50 into a battery case 15.

Figure 1:
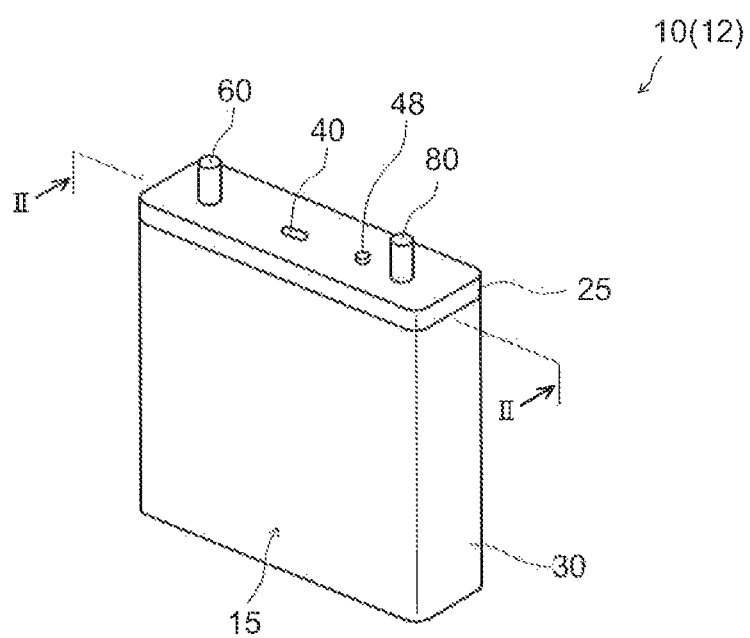
FIG. 1 is a perspective view schematically illustrating the exterior of the nonaqueous electrolyte secondary battery in one embodiment of the present invention.

As shown in FIGS. 1 and 2, the battery case 15 is metal (for example, made of aluminum, or one made of plastic or laminated film is also suitable), and includes a flattened, box-shaped (typically rectangular) case body 30 (exterior case) with a closed bottom and an open top, and a lid 25 that covers the open part 20 of the case body 30. The lid 25 is sealed to the open part 20 of the case body 30 by welding, etc. A positive terminal 60 electrically connected to the positive electrode 64 of the wound electrode assembly 50 and a negative terminal 80 electrically connected to the negative electrode 84 thereof are provided on the top surface of the battery case 15 (i.e., the lid 25). Moreover, as shown in FIG. 2, a fill hole 45 is formed in the lid 25 to enable injection of the nonaqueous electrolyte described below into the wound electrode assembly 50 housed in the case body 30 (battery case 15). The fill hole 45 is temporarily sealed after the first injection step (S20) by a sealing plug 48 and then completely sealed after the second injection step (S40). Moreover, a safety valve 40 for discharging gases that have been generated inside the battery case 15 to the outside of the battery case 15 in the event of a battery malfunction is provided in the lid 25 just as in previous lithium-ion secondary batteries.

<<First Injection Step (S20)>>

Next the first injection step (S20) will be explained. The first injection step comprises injecting into the battery case 15 a nonaqueous electrolyte containing an additive that decomposes at a predetermined charging voltage and forms a coating on the surface of the negative electrode active material in the negative electrode active material layer 86.

A substance that decomposes at a predetermined charging voltage (for example, approximately 3.7 V to 4.1 V) and forms an additive-derived coating on the surface of the negative electrode active material in the negative electrode active material layer 86 can be used as the additive. Examples include an alkali metal salt containing lithium such as lithium bis(oxalate)borate (LiBOB) and lithium difluorophosphate, or a carbonate compound containing an ethylenically unsaturated bond such as vinylene carbonate, vinyl ethylene carbonate, methyl vinylene carbonate, ethyl vinylene carbonate, propyl vinylene carbonate, fluoroethylene carbonate, and the like. Preferably, the additive is lithium bis(oxalate)borate. One of these additives can be used alone, or two or more can be mixed together and used.

A nonaqueous electrolyte prepared by dissolving a lithium salt that can function as a supporting electrolyte (supporting salt) in an organic solvent (nonaqueous medium) can be used as the nonaqueous electrolyte. An aprotic medium such as a carbonate, ester, ether, nitrile, sulfone, lactone, and the like can be used as the organic solvent. Examples of carbonates include ethylene carbonate (EC), propylene carbonate (PC), diethyl carbonate (DEC), dimethyl carbonate (DMC), ethyl methyl carbonate (EMC), and the like. Only one type of these organic solvents can be used alone, or two or more types can be combined and used together.

Examples of the lithium salts include $LiPF_6$, $LiClO_4$, $LiAsF_6$, $Li(CF_3SO_2)_2N$, $LiBF_4$, $LiCF_3SO_3$, and the like. Only one type of these lithium salts can be used alone, or two or more types can be combined and used together. $LiPF_6$ is particularly preferred.

The amount of additive to be used is not particularly limited herein, but when the total amount of nonaqueous electrolyte and additive are assigned a value of 100 mass %, the amount of additive will be approximately 0.5 mass % to 5 mass % (for example, approximately 0.5 mass % to 2 mass %).

Here the void volume (space volume) V1 of the wound electrode assembly (electrode assembly) 50 is equivalent to the amount of nonaqueous electrolyte (volume) that can be retained in the wound electrode assembly 50.

The void volume (space volume) V1 can be determined from the sum of void volume V2 of the materials themselves consisting of the void volume [$cm^3$] of the positive electrode 64, the void volume [$cm^3$] of the negative electrode 84, and the void volume [$cm^3$] of the separators 90, and of total void volume V3 consisting of the void volume [$cm^3$] between the positive electrode 64 and the separators 90, and the void volume [cm$^3$] between the negative electrode 84 and the separators 90. In other words, V1=V2+V3.

Here the void volume [cm$^3$] of the positive electrode 64 can be determined, for example, by subtracting the volume [cm$^3$] of the positive electrode active material and the volume [cm$^3$] of auxiliary material such as conductive material and binder from the apparent volume [cm$^3$] of the positive electrode active material layer 66.

Moreover, the void volume [cm$^3$] of the negative electrode 84 can be determined, for example, by subtracting the volume [cm$^3$] of the negative electrode active material and the volume [cm$^3$] of auxiliary material such as binder and thickener from the apparent volume [cm$^3$] of the negative electrode active material layer 86.

Furthermore, the void volume [cm$^3$] of the separators 90 can be determined, for example, from the product of the apparent volume [cm$^3$] of the separators and the porosity (void ratio) [%]. Here the porosity [%] can be determined, for example, from the formula: porosity [%]=(1−Ws/ρsVs)× 100, wherein Ws represents the mass of the separators, Vs represents the apparent volume of the separators, and ρs represents the true density of the separators (a value obtained by dividing mass WS by the solid volume excluding the pores). Alternatively, porosity [%] can be calculated by the mercury intrusion method using mercury intrusion porosimetry. The separator porosity can be controlled by adjusting the amount of plasticizer, the draw ratio, etc., used for the separators.

Furthermore, for the total void volume V3, for example, first the volume of the nonaqueous electrolyte that is injected onto the battery case 15 that houses the wound electrode assembly 50 is slowly increased, the AC impedance of the battery assembly 12 after injection of the nonaqueous electrolyte is measured, and when the AC impedance has stopped dropping (i.e., a state wherein the nonaqueous electrolyte has impregnated the entirety of the wound electrode assembly 50) the amount of nonaqueous electrolyte that has been injected into the battery assembly 12 is found. Then, the total void volume V3 can be determined by subtracting the void volume V2 of the material of the wound electrode assembly 50 from the amount of nonaqueous electrolyte that has been determined.

Therefore, in the first injection step, the injection amount [g] of the nonaqueous electrolyte containing the additive that is to be injected into the battery case 15 is determined to be set to an amount equal to or greater than (for example, an equivalent amount) the amount of nonaqueous electrolyte [g] that can be retained in the voids of the wound electrode assembly 50 having void volume V1 [cm$^3$]. Moreover, when the total amount [g] of nonaqueous electrolyte to be injected into the battery case in both the first injection step and the second injection step is assigned a value of 100 mass %, it is preferable for the injection amount [g] of nonaqueous electrolyte containing the additive in the first injection step to be set at 60 mass % to 80 mass % (preferably 65 mass % to 75 mass %).

Typically after the first injection step the fill hole 45 is temporarily sealed with the sealing plug 48. Preferably, a step is also included wherein the battery assembly is let stand for a long enough time for the injected nonaqueous electrolyte containing the additive to be retained throughout the entirety of the wound electrode assembly (electrode assembly) 50. For example, by letting the battery assembly stand for approximately 1 hour to 5 hours (for example, 1 hour to 2 hours) after the nonaqueous electrolyte containing the additive is injected into the battery case 15, the nonaqueous electrolyte containing the additive that has been injected into the battery case 15 is retained (impregnated) throughout the entirety of the wound electrode assembly 50.

<<Precharging Step (S30)>>

Next the precharging step (S30) will be explained. The precharging step comprises forming an additive-derived coating on the surface of the negative electrode active material in the negative electrode active material layer 86 by charging the battery assembly 12 up to a predetermined charging voltage.

In this step charging of the battery assembly 12 is carried out, for example, at a charge rate of approximately 0.2 C to 1 C up to a predetermined voltage (for example, 3.7 V to 4.1 V, i.e., equivalent to SOC 50% to SOC 100%) whereat the additive will at least decompose. By so doing the additive in the nonaqueous electrolyte that has been impregnated into the wound electrode assembly 50 will decompose, and an additive-derived coating will be formed on the surface of the negative electrode active material in the negative electrode active material layer 86 in a preferred state (i.e., a state wherein non-uniformity will be controlled in the coating on the negative electrode active material in the crosswise direction orthogonal to the lengthwise direction of the negative electrode active material layer 86). It should be noted that "1 C" refers to the current capable of charging the battery capacity (Ah) predicted by the theoretical capacity of the positive electrode in 1 hour.

If, as in the past, an excessive amount of nonaqueous electrolyte is present in the battery case 15 when the additive decomposes to form a coating, because the excess nonaqueous electrolyte will be present at the end portions of the negative electrode active material layer 86 in the crosswise direction (i.e., the direction of the winding axis) that runs orthogonal to the lengthwise direction of the negative current collector 82, there is concern that the additive-derived coating will mostly be formed at the end portions, and there will be greater non-uniformity in the coating on the negative electrode active material in the crosswise direction. In the present invention, however, an excess amount of nonaqueous electrolyte is not present in the battery case 15 because the amount of nonaqueous electrolyte containing the additive that is injected into the battery case 15 in the first injection step is adjusted, and therefore the coating can be formed in a state such that the non-uniformity of the coating on the negative electrode active material that originates in additive contained in the excess nonaqueous electrolyte is controlled (preferably a uniform state in the crosswise direction).

In this precharging step, after the battery assembly 12 has been charged as described above, discharging can be carried out at a discharge rate of approximately 0.2 C to 1 C down to a predetermined voltage (for example, 3 V to 3.2 V, i.e., equivalent to SOC 0% to SOC 20%). Moreover, the charge-discharge cycle can be repeated a plurality of times (for example, 3 times).

<<Second Injection Step (S40)>>

Next the second injection step (S40) will be explained. The second injection step comprises injecting into the battery case 15 a nonaqueous electrolyte not containing the additive that decomposes at a predetermined charging voltage and forms a coating on the surface of the negative electrode active material in the negative electrode active material layer 86.

The nonaqueous electrolyte is prepared by dissolving a lithium salt in an organic solvent, and examples thereof are the same as that used in the first injection step. Preferably the same nonaqueous electrolyte used in the first injection step is suitably used in the second injection step. Moreover, it is preferable that the injection amount [g] of nonaqueous electrolyte not containing the additive in the second injection step is set to 20 mass % to 40 mass % (preferably 25 mass % to 35 mass %) when the total amount [g] of nonaqueous electrolyte to be injected into the battery case in both the first injection step and the second injection step is assigned a value of 100 mass %.

The temporary seal is removed before this second injection step, and then the nonaqueous electrolyte not containing the additive is injected into the battery case 15. Furthermore, after the second injection step, the fill hole 45 is sealed with the sealing plug 48 by welding and the like.

It should be noted that the total amount [g] of nonaqueous electrolyte injected in the first injection step and the second injection step is determined based on the total of both the amount of nonaqueous electrolyte [g] that can be retained in the voids of the wound electrode assembly 50 and the amount [g] of nonaqueous electrolyte that is added to compensate for the loss of lithium ions (charge carrier) in the nonaqueous electrolyte accompanying the charging and discharging of the lithium-ion secondary battery (nonaqueous electrolyte secondary battery).

<<Charge and Discharge Step (S50)>>

Next the charge and discharge step (S50) will be explained. The charge and discharge step comprises discharging the battery assembly 12 to a predetermined discharge voltage after charging to a predetermined charging voltage.

In this step, for example, the battery assembly 12 is charged at a charge rate of approximately C/3 to 1 C to a predetermined voltage (i.e., the upper limit voltage, for example, 4.1 V to 4.2 V, which is equivalent to SOC 100%). Thereafter, the battery assembly 12 is discharged at a discharge rate of approximately C/3 to 1 C to a predetermined voltage (i.e., the lower limit voltage, for example, 3 V, which is equivalent to SOC 0%). Preferably, the charge-discharge cycle is repeated a plurality of times (for example, 3 times). Through performing this kind of charge and discharge treatment on the battery assembly 12, the battery assembly 12 then turns into a battery that can be used, i.e., a lithium-ion secondary battery (nonaqueous electrolyte secondary battery) 10. In this charge and discharge step the state of the coating formed in the precharging step (S30) can be maintained without the additional formation of additive-derived coating during charging and discharging because the excess electrolyte present around the wound electrode assembly 50 (nonaqueous electrolyte injected in the second injection step) contains substantially no additive.

Next a case wherein lithium bis(oxalate)borate (LiBOB) is used as the additive in the lithium-ion secondary battery (nonaqueous electrolyte secondary battery) 10 manufactured by the production method disclosed herein will be explained as an example.

Figure 4:
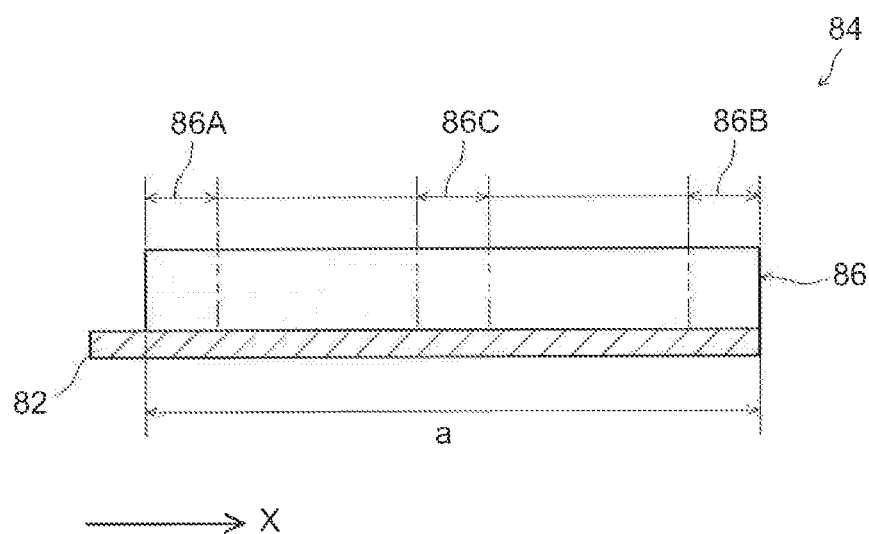
FIG. 4 is a cross-sectional view schematically illustrating the structure of the negative electrode of the nonaqueous electrolyte secondary battery in one embodiment of the present invention.

As shown in FIG. 2, the lithium-ion secondary battery 10 of this embodiment includes a stacked or wound electrode assembly (in this case a wound electrode assembly) 50 including a positive electrode 64 and a negative electrode 84, and nonaqueous electrolyte. As shown in FIG. 4, the negative electrode 84 includes a negative current collector 82, and negative electrode active material layer 86 containing at least a negative electrode active material (for example, natural graphite particles) formed on the surface of the negative current collector 82.

The length of the negative electrode active material layer 86 (i.e., length a in FIG. 4) in the crosswise direction orthogonal to the lengthwise direction of the negative current collector 82 is not particularly limited in this embodiment, but the advantageous effect of the present invention can be particularly well exhibited in a layer having a length of at least about 80 mm. For example, the layer is about 80 mm to 150 mm, and preferably about 100 mm to 120 mm.

A boron-containing coating derived from the LiBOB and containing at least boron (B) is formed on the surface of the negative electrode active material that is contained in the negative electrode active material layer 86. In this case, the value A/B is 1 to 1.3, wherein A/B represents the ratio of boron content A [mass %] in the negative electrode active material layer 86, when the solid content at either end portion 86A, 86B (i.e., where the boron content is greater) in the crosswise (the direction indicated by arrow X in FIG. 4) (for example, about ⅓ of the region from the edge toward the midpoint of the negative electrode active material layer 86 in the crosswise direction) is assigned a value of 100 mass %, to boron content B [mass %] in the negative electrode active material layer 86, when the solid content at the central portion 86C containing the midpoint in the crosswise direction (for example, about ⅓ of the region of negative electrode active material layer 86 in the crosswise direction that contains the midpoint) is assigned a value of 100 mass %.

When manufactured by a prior art method, the boron content in the boron-containing coating that is formed on the surface of the negative electrode active material in the negative electrode active material layer tends to be larger in the negative electrode active material present in the end portions of the crosswise direction and smaller in the negative electrode active material present in the central portion, so there has been much coating non-uniformity in the crosswise direction of the negative electrode active material layer. On the surface of the negative electrode active material within the negative electrode active material layer 86 of the lithium-ion secondary battery 10 disclosed herein, however, there is little non-uniformity in the boron-containing coating in the crosswise direction of the negative electrode active material layer 86 (the boron-containing coating is formed uniformly throughout the crosswise direction in a favorable state), and therefore a lithium-ion secondary battery (nonaqueous electrolyte secondary battery) 10 exhibiting high capacity retention rate can be obtained.

Embodiments relevant to the present invention are described below, but the present invention is by no means limited to the items shown in these embodiments.

FABRICATION OF A LITHIUM-ION SECONDARY BATTERY NONAQUEOUS ELECTROLYTE SECONDARY BATTERY

Examples

Example 1

A paste-like composition for forming the positive electrode active material layer was prepared by weighing out $LiNi_{1/3}Mn_{1/3}Co_{1/3}O_2$ as the positive electrode active material, acetylene black as the conductive material, and PVDF as the binder in a mass ratio of 90:8:2, and then dispersing these materials in NMP. The composition was applied at a coating spread of 6 mg/cm$^2$ to one side of a 15 μm thick, 4500 mm long, and 110 mm wide current collector (aluminum foil), and the applied composition was then dried to prepare a positive electrode sheet including a positive electrode active material layer 94 mm long and 155 μm thick in the crosswise direction on the positive current collector.

Separately, a paste-like composition for forming the negative electrode active material layer was prepared by weighing out natural graphite particles as the negative electrode active material and SBR as the binder in a mass ratio of 93:7, and then dispersing these materials in water. The composition was applied at a coating spread of 4 mg/cm² to one side of a 20 μm thick, 4700 mm long, and 115 mm wide current collector (copper foil), and the applied composition was then dried to prepare a negative electrode sheet including a negative electrode active material layer 100 mm long and 130 μm thick in the crosswise direction on the negative current collector.

Furthermore, a wound electrode assembly was fabricated by winding the prepared positive electrode sheet and negative electrode sheet interspersed with two 20 μm thick separator sheets (polypropylene/polyethylene/polypropylene three-layer structure). The electrode assembly was housed in a prismatic case to prepare the battery assembly of Example 1 (battery assembly preparation step). Next 87.5 g of nonaqueous electrolyte (equivalent to 70 mass % of the total amount of nonaqueous electrolyte to be injected into the prismatic case) containing 2.45 g of additive was injected into the prismatic case (first injection step). To prepare the nonaqueous electrolyte, 1 mol/L of $LiPF_6$ was dissolved in a mixed solvent of ethylene carbonate (EC), dimethyl carbonate (DMC) and ethyl methyl carbonate (EMC) at a volume ratio of 3:4:3. Lithium bis(oxalate)borate (LiBOB) was used as the additive.

After the first injection step the injected nonaqueous electrolyte was retained (impregnated) throughout the entirety of the wound electrode assembly by temporarily sealing the fill hole and letting the battery assembly stand for 1 hour. Then at a temperature of 25° C., constant current charging of the battery assembly was carried out at a charge rate of C/3 (8 A) to 3.95 V (equivalent to SOC 85%). After a pause of 30 minutes, constant current discharging was carried out at a discharge rate of C/3 (8 A) to 3V (precharging step). Next the temporary seal was removed from the fill hole, and 37.5 g (equivalent to 30 mass % of the total amount of nonaqueous electrolyte to be injected into the prismatic case) of nonaqueous electrolyte (the same electrolyte used in the first injection step) that did not contain the additive was injected into the prismatic case (second injection step). Then the fill hole was sealed. A procedure of charging the battery assembly at a charge rate of C/3 (8 A) to 4.1 V followed by a procedure of discharging at a discharge rate of C/3 (8 A) to 3 V was repeated 3 times (charge and discharge step). The lithium-ion secondary battery of Example 1 with a rated capacity of 24 Ah was fabricated in this manner, and the battery including a negative electrode in which an additive-derived coating was formed on the surface of the negative electrode active material.

Example 2

First 125 g of nonaqueous electrolyte (equivalent to 100 mass % of the total amount of nonaqueous electrolyte to be injected into the prismatic case) containing 2.45 g of additive was injected into the prismatic case of the battery assembly of Example 1. Then the lithium-ion secondary battery of Example 2 was prepared by carrying out the charge and discharge step in the same manner as in Example 1 without performing the precharging step or second injection step.

Example 3

The lithium-ion secondary battery of Example 3 was prepared in the same manner as in Example 1 except in the second injection step 37.5 g of nonaqueous electrolyte (equivalent to 30 mass % of the nonaqueous electrolyte to be injected into the prismatic case) containing 0.75 g of additive was injected into the prismatic case.

Example 4

The lithium-ion secondary battery of Example 4 was prepared in the same manner as in Example 1 except in the first injection step 87.5 g of nonaqueous electrolyte (equivalent to 70 mass % of the total amount of nonaqueous electrolyte to be injected into the prismatic case) that did not contain the additive was injected into the prismatic case, and in the second injection step 37.5 g of nonaqueous electrolyte (equivalent to 30 mass % of the total amount of nonaqueous electrolyte to be injected into the prismatic case) that did not contain the additive was injected into the prismatic case.

Example 5

After 87.5 g of nonaqueous electrolyte (equivalent to 100 mass % of the total amount of nonaqueous electrolyte to be injected into the prismatic case) containing 2.45 g of additive was injected into the prismatic case of the battery assembly of Example 1, substantially all of the injected nonaqueous electrolyte was retained in the wound electrode assembly by sealing the fill hole and letting the battery assembly stand for 1 hour. Then the lithium-ion secondary battery of Example 5 was prepared by carrying out the charge and discharge step in the same manner as in Example 1 without performing the precharging step and second injection step. Table 1 shows the amounts of nonaqueous electrolyte [g] and additive [g] that were injected in each injection step in the lithium-ion secondary batteries of Examples 1 to 5.

TABLE 1

| Example | 1 | 2 | 3 | 4 | 5 |
|---|---|---|---|---|---|
| Amount of nonaqueous electrolyte in first injection step [g] | 87.5 | 125 | 87.5 | 87.5 | 87.5 |
| Amount of additive in nonaqueous electrolyte in first injection step [g] | 2.45 | 2.45 | 2.45 | 0 | 2.45 |
| Amount of nonaqueous electrolyte in second injection step [g] | 37.5 | 0 | 37.5 | 37.5 | 0 |
| Amount of additive in nonaqueous electrolyte in second injection step [g] | 0 | 0 | 0.75 | 0 | 0 |
| Total amount of nonaqueous electrolyte [g] | 125 | 125 | 125 | 125 | 87.5 |
| Capacity retention rate [%] | 85 | 79 | 80 | 75 | 72 |

[Measurement of Capacity Retention Rate]

The lithium-ion secondary batteries prepared in Examples 1 to 5 were charged and discharged repeatedly for 2000 cycles, and the capacity retention rate [%] was measured every 500 cycles. More specifically, 2000 cycles were repeated at 60° C. comprising procedure of constant current-constant voltage charging (CC-CV charging) at a C/3 (8 A) charge rate to 4.1 V was followed by a procedure of constant current-constant voltage discharging (CC-CV discharging) at a discharge rate of C/3 (8 A) to 3.0 V. The ratio of the discharge capacity after 500, 1000, 1500, and 2000 cycles, respectively, to the discharge capacity after 1 cycle (initial capacity) ((discharge capacity after each cycle/initial capacity)×100(%)) was calculated as the capacity retention rate (%). The results are shown in Table 1 and FIG. 5.

Figure 5:
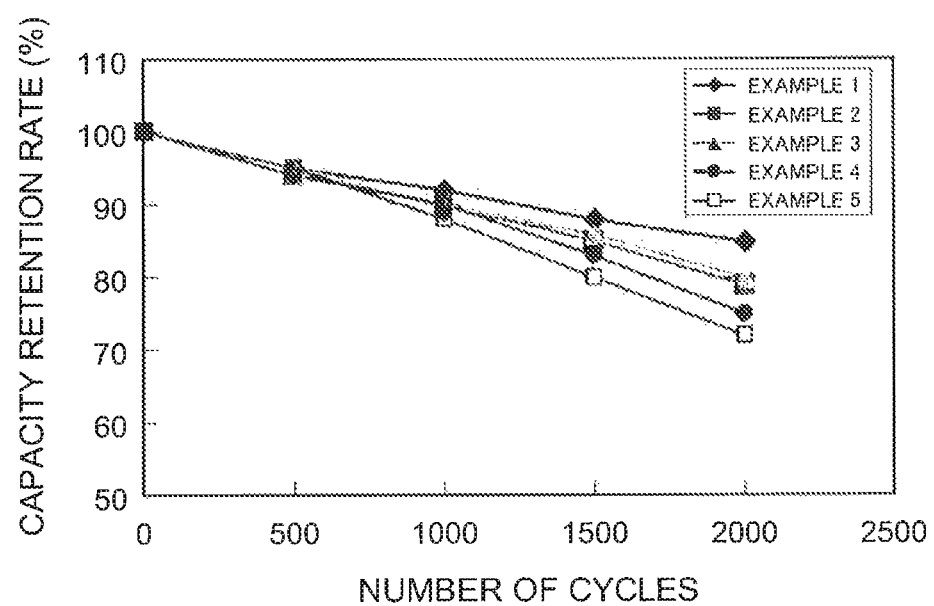
FIG. 5 is a graph showing the relationship between capacity retention rate and cycle number of the nonaqueous electrolyte secondary batteries of Examples 1 to 5.

As shown in Table 1 and FIG. 5, no large differences were seen in the capacity retention rate of the examples after 500 cycles. However, when the cycle number surpassed 500, the differences between the examples increased as the number of cycles increased, and it was confirmed that the secondary battery of Example 1 had the best capacity retention rate. In particular, it was confirmed that after 2000 cycles the capacity retention rate of the secondary battery in Example 1 was higher than in Examples 2 to 5, and the percentage of decline was also smaller. From these results it was confirmed that a lithium-ion secondary battery formed by injecting nonaqueous electrolyte containing the additive in a first injection step and injecting a nonaqueous electrolyte not containing the additive in a second injection step as in Example 1 results in a battery with excellent performance that provides high capacity retention rate. When the secondary batteries of Examples 1 and 5 were compared, it was confirmed that capacity retention rate is greatly increased by injecting the nonaqueous electrolyte not containing the additive in the second injection step.

[Measurement of Boron Content]

The lithium-ion secondary batteries of Examples 1 and 2 were fabricated separately, the negative electrode of each was removed, and the boron content [mass %] in the boron-containing coating formed on the surface of the negative electrode active material in the negative electrode active material layer was analyzed quantitatively using ICP emission spectrometry. More specifically, as shown in FIG. 7, the negative electrode active material layer (length a in the crosswise direction is 100 mm) was cut to a length of 40 mm in the lengthwise direction, this was divided into 5 regions of 15 mm each in the crosswise direction (A, B, C, D, and E in the drawing), the boron content [µg] in each region was measured, and the boron content [mass %] was calculated when the solid content of the negative electrode active material layer in each region was assigned a value of 100 mass %. The measurement results are shown in Table 2 and FIG. 6.

TABLE 2

| | Example | | | | |
|---|---|---|---|---|---|
| | region A | region B | region C | region D | region E |
| | 1 | | | | |
| Boron content [mass %] | 0.032 | 0.029 | 0.026 | 0.029 | 0.03 |
| | 2 | | | | |
| Boron content [mass %] | 0.036 | 0.028 | 0.022 | 0.029 | 0.035 |

Figure 6:
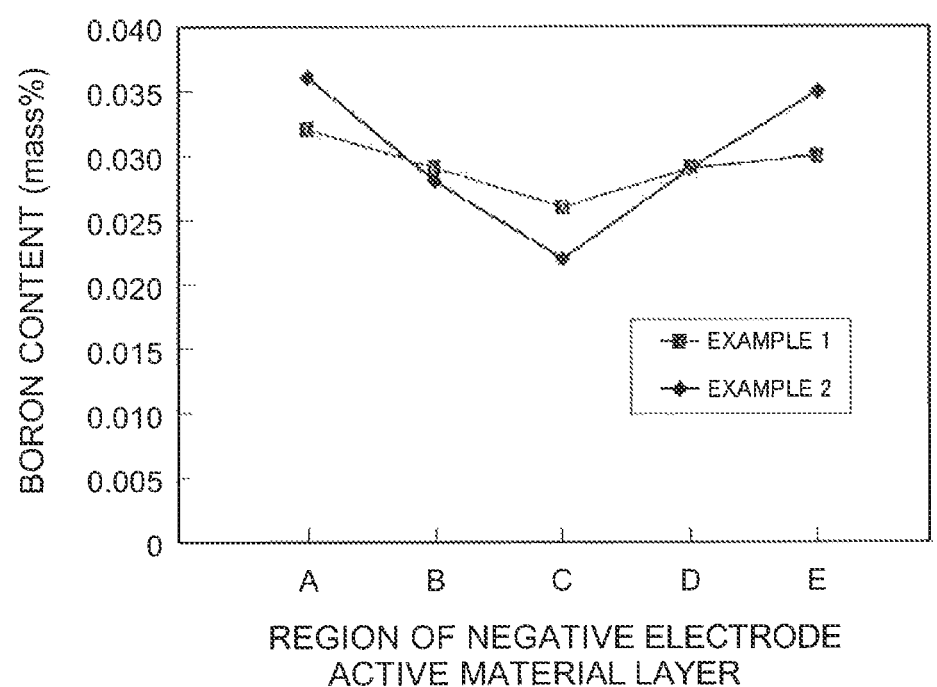
FIG. 6 is a graph showing the boron content in each region in the crosswise direction of the negative electrode active material layer of the nonaqueous electrolyte secondary batteries of Examples 1 and 2.
Figure 7:
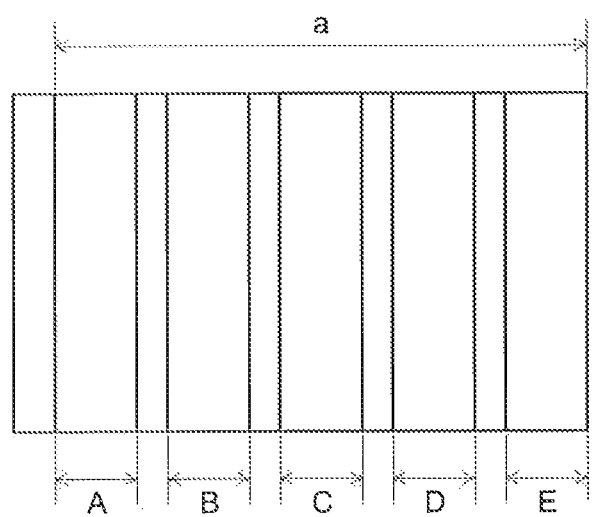
FIG. 7 is a plan view schematically illustrating the structure of the negative electrode used when measuring the boron content.

As shown in FIGS. 2 and 6, the coating formed on the surface of the negative electrode active material in the negative electrode active material layer of the secondary battery of Example 2 has a large boron content at the end portions of the negative electrode active material layer and has a low boron content in the central portion containing the midpoint, so it was confirmed that there is a large amount of non-uniformity in the coating of the negative electrode active material in the crosswise direction of the negative electrode active material layer. Meanwhile, the coating formed on the surface of the negative electrode active material in the negative electrode active material layer of the secondary battery of Example 1 has a lower boron content at the end portions than Example 2 and a greater boron content at the central portion containing the midpoint, so it was confirmed that overall there is less coating non-uniformity in the crosswise direction of the negative electrode active material layer.

From these findings and the capacity retention rate results, it appears that the capacity retention rate of a lithium-ion secondary battery (nonaqueous electrolyte secondary battery) increases as the non-uniformity of the coating formed on the surface of the negative electrode active material in the negative electrode active material layer decreases. In this instance, in Example 1 the value of A/B was 1.23, wherein A/B represents the ratio of boron content A [mass %] at either end portion (region A) in the crosswise direction of the negative electrode active material layer to boron content B [mass %] in the central portion containing the midpoint in the crosswise direction (region C). Conversely, the value of A/B in Example 2 was 1.64. From the above results, it was confirmed that the preferred value for A/B is 1 to 1.3 (for example, 1 to 1.25).

Example 6

The lithium-ion secondary battery of Example 6 was prepared in the same manner as in Example 1 except in the first injection step 68.75 g of nonaqueous electrolyte (equivalent to 55 mass % of the total amount of nonaqueous electrolyte to be injected into the prismatic case) containing 2.5 g of lithium bis(oxalate)borate, 1.25 g of vinylene carbonate and 1.25 g of lithium difluorophosphate as additive was injected into the prismatic case, and in the second injection step 56.25 g of nonaqueous electrolyte (the same electrolyte used in the first injection step) that did not contain the additive (equivalent to 45 mass % of the total amount of nonaqueous electrolyte to be injected into the prismatic case) was injected into the prismatic case.

Examples 7 to 11

Next the lithium-ion secondary batteries of Examples 7 to 11 were fabricated. In the lithium-ion secondary batteries of Examples 7 to 11, the same additive and amount thereof as in Example 6 were used in the first injection step, but in these lithium-ion secondary batteries the amounts of nonaqueous electrolyte injected into the prismatic case in the first injection step and the second injection step were varied. Table 3 shows the amounts of nonaqueous electrolyte that were injected in each injection step in the lithium-ion secondary batteries of Examples 7 to 11.

TABLE 3

| Example | 6 | 7 | 8 | 9 | 10 | 11 |
|---|---|---|---|---|---|---|
| Amount of nonaqueous electrolyte in first injection step [g] | 68.75 | 75 | 81.25 | 93.75 | 100 | 106.25 |
| Amount of nonaqueous electrolyte in second injection step [g] | 56.25 | 50 | 43.75 | 31.25 | 25 | 18.75 |
| Total amount of nonaqueous electrolyte [g] | 125 | 125 | 125 | 125 | 125 | 125 |
| Ratio of amount of nonaqueous electrolyte in first injection step to total amount of nonaqueous electrolyte [mass %] | 55 | 60 | 65 | 75 | 80 | 85 |
| Capacity retention rate [%] | 76 | 82 | 86 | 85 | 83 | 77 |

[Measurement of Capacity Retention Rate]

The lithium-ion secondary batteries prepared in Examples 6 to 11 were charged and discharged for 2000 cycles and capacity retention rate [%] after 2000 cycles was determined under the same conditions as in the lithium-ion secondary batteries of Examples 1 to 5. The measurement results are shown in Table 3.

As shown in Table 3, the capacity retention rate was considerably lower in the lithium-ion secondary batteries wherein the ratio of the amount of nonaqueous electrolyte injected in the first injection step was 55 mass % or less, or was 85 mass % or more of the total amount of nonaqueous electrolyte injected in the first and second injection steps. Moreover, it was confirmed that the capacity retention rate was best in lithium-ion secondary batteries wherein that ratio was 65 mass % to 75 mass % of the total amount. From these results it was confirmed that it is preferable for the injection amount of nonaqueous electrolyte in the first injection step to be set at 60 mass % to 80 mass % (preferably 65 mass % to 75 mass %) when the total amount of nonaqueous electrolyte to be injected into the battery case in both the first injection step and the second injection step is assigned a value of 100 mass %.

Specific examples of the present invention were described in detail above, but these are merely examples and do not restrict the scope of the claims in any way. The technology described in the claims includes a variety of modifications and changes in the concrete embodiments exemplified above.

INDUSTRIAL APPLICABILITY

Figure 8:
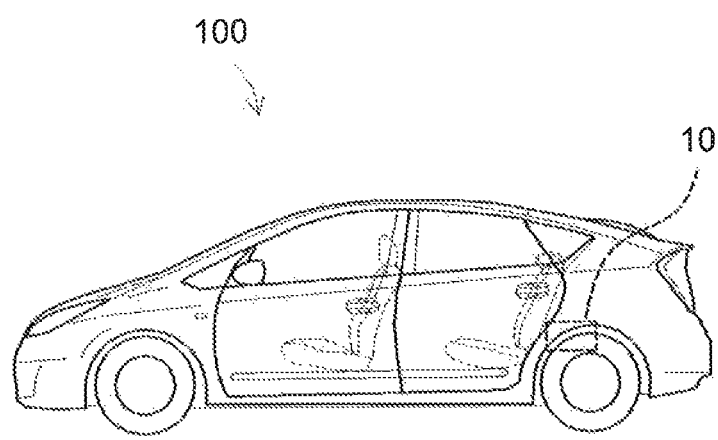
FIG. 8 is a side view schematically illustrating a vehicle (an automobile) equipped with the nonaqueous electrolyte secondary battery of the present invention.

The nonaqueous electrolyte secondary battery obtained by the production method of the present invention exhibits high capacity retention rate because in the additive-derived coating formed on the surface of the negative electrode active material in the negative electrode active material layer, non-uniformity in the crosswise direction orthogonal to the lengthwise direction of the negative electrode active material layer is controlled. Therefore, it can be used as a nonaqueous electrolyte secondary battery in a variety of practical applications. As shown in FIG. 8, for example, it can be suitably used as a power source for a motor to drive a vehicle (motor driving power supply) to be mounted in a vehicle 100 such as an automobile. The nonaqueous electrolyte secondary battery (lithium-ion secondary battery) 10 used in the vehicle 100 can be used alone, or it can be used in the form of a battery pack wherein a plurality thereof are connected in series and/or parallel.

REFERENCE SIGNS LIST

10 Lithium-ion secondary battery (nonaqueous electrolyte secondary battery)
12 Battery assembly
15 Battery case
20 Opening
25 Lid
30 Case body
40 Safety valve
45 Fill hole
48 Sealing plug
50 Electrode assembly (wound electrode assembly)
60 Positive terminal
62 Positive current collector
64 Positive electrode
66 Positive electrode active material layer
80 Negative terminal
82 Negative current collector
84 Negative electrode
86 Negative electrode active material layer
86A, 86B End portion
86C Central portion
90 Separator
100 Vehicle (automobile)

The invention claimed is:

1. A method for producing a nonaqueous electrolyte secondary battery, comprising:
   a step of preparing a battery assembly in which an electrode assembly is housed within a battery case, the electrode assembly including a positive electrode produced by forming a positive electrode active material layer containing at least a positive electrode active material on a positive current collector, and a negative electrode produced by forming a negative electrode active material layer containing at least a negative electrode active material on a negative current collector;
   a first injection step of injecting, into the battery case, a nonaqueous electrolyte containing lithium bis(oxalate) borate that decomposes and forms a coating on the surface of the negative electrode active material at a predetermined charging voltage, wherein the amount of lithium bis(oxalate)borate is 0.5 mass % to 5 mass % with respect to the total amount of the nonaqueous electrolyte;
   a precharging step of forming the lithium bis(oxalate) borate-derived coating that satisfies the value A/B is 1 to 1.3, the value representing the ratio of boron content A in mass % in the negative electrode active material layer, when the solid content of the negative electrode active material layer at either end portion in a crosswise direction orthogonal to a lengthwise direction of the negative current collector is assigned a value of 100 mass %, to boron content B in mass % in the negative electrode active material layer, when the solid content of the negative electrode active material layer at the central portion containing a midpoint in the crosswise direction is assigned a value of 100 mass % on the surface of the negative electrode active material by charging the battery assembly up to at least the predetermined charging voltage;
   a second injection step of injecting, into the battery case, a nonaqueous electrolyte not containing lithium bis (oxalate)borate that decomposes and forms a coating on the surface of the negative electrode active material at the predetermined charging voltage; and
   a charge and discharge step of, after the battery assembly has been charged to the predetermined charge voltage, discharging the battery assembly to a predetermined discharge voltage,
   wherein, after the first injection step, the battery assembly is let stand for 1 hour to 5 hours, and the nonaqueous electrolyte containing the lithium bis(oxalate)borate is retained throughout the entirety of the electrode assembly.

2. The production method according to claim 1, wherein, when the total amount of nonaqueous electrolyte injected into the battery case in the first injection step and the second injection step is assigned a value of 100 mass %, the amount of nonaqueous electrolyte injected in the first injection step is determined to be set at 60 mass % to 80 mass %, and also to be greater than or equal to the amount of nonaqueous electrolyte that can be retained in the electrode assembly.

3. The production method according to claim 1, wherein after the first injection step, the battery assembly is let stand for 1 hour to 2 hours.

4. The production method according to claim 1, wherein charging is performed such that the SOC reaches 50% to 100% in the precharging step.

5. The production method according to claim 4, wherein charging is performed such that the SOC reaches 85% or more in the precharging step.

6. The production method according to claim 1, wherein a negative electrode including a negative current collector and a negative electrode active material layer containing at least a negative electrode active material and formed on the surface of the negative current collector is used as the negative electrode, the length of the negative electrode active material layer in a crosswise direction orthogonal to a lengthwise direction of the negative current collector being at least 80 mm.

7. A nonaqueous electrolyte secondary battery comprising:

a stacked or wound electrode assembly including a positive electrode and a negative electrode; and a nonaqueous electrolyte, wherein the negative electrode includes a negative current collector and a negative electrode active material layer containing at least a negative electrode active material and formed on the surface of the negative current collector, a boron-containing coating that contains at least boron is formed on the surface of the negative electrode active material in the negative electrode active material layer, and the value A/B is 1 to 1.3, the value representing the ratio of boron content A in mass % in the negative electrode active material layer, when the solid content of the negative electrode active material layer at either end portion in a crosswise direction orthogonal to a lengthwise direction of the negative current collector is assigned a value of 100 mass %, to boron content B in mass % in the negative electrode active material layer, when the solid content of the negative electrode active material layer at the central portion containing a midpoint in the crosswise direction is assigned a value of 100 mass %.

8. The nonaqueous electrolyte secondary battery according to claim 7, wherein the length of the negative electrode active material layer in the crosswise direction is at least 80 mm.

* * * * *